A. Hall,
Wood Auger.
N° 17,038.  Patented Apr. 14, 1857.
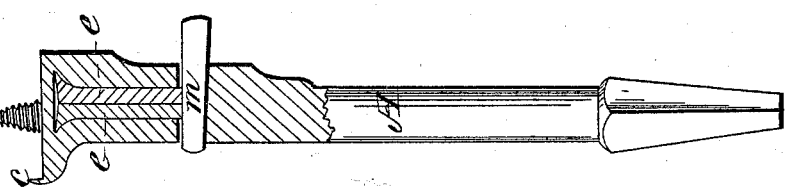
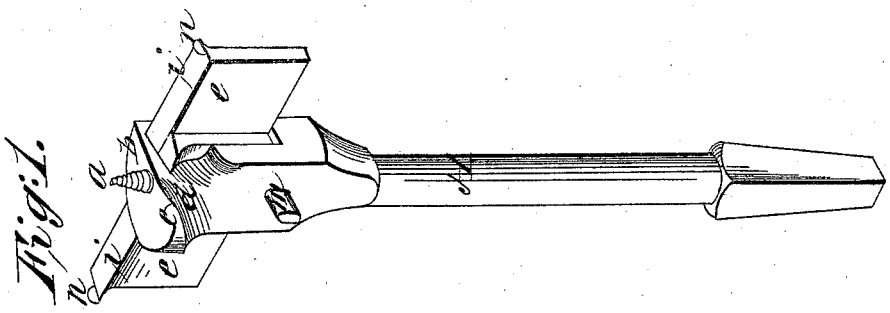

UNITED STATES PATENT OFFICE.

ALEX. HALL, OF NEW YORK, N. Y.

EXPANSIVE BIT.

Specification of Letters Patent No. 17,038, dated April 14, 1857.

*To all whom it may concern:*

Be it known that I, ALEXANDER HALL, of the city, county, and State of New York, have invented certain new and useful Improvements in Expanding Bits; and I do hereby declare the following to be a full, clear, and exact description of the same, reference being had to the accompanying drawings, making a part thereof, in which—

Figure 1, represents an auger, with double expanding bits. Fig. 2, represents an auger with a single expanding bit; and, Fig. 3, represents a cross section taken through Fig. 1, to show the shape of the bits, and the mortise through the shank for their reception.

Similar letters of reference where they occur in the several figures, denote like parts in all.

The nature of my invention consists in allowing the bits with their turned lips to slide through a mortise in the boring tool, and in holding said bits when adjusted in the mortise by a pin, which not only gives the bits more firmness, and stability in the boring tool, but allows greater facility for removing or adjusting the bits, as well as economy in their construction.

To enable others skilled in the art to make and use my invention, I will proceed to describe the same with reference to the drawings.

A, represents a boring tool, having the usual screw $a$, cutting edge $b$, and lip $c$. A throat $d$ is formed just above the cutting edge $b$, to allow the auger to clear itself of the chips.

At, about right angles, with the line of the cutting edge $b$, a mortise is made through the shank of the boring tool, which is the counterpart in form of a single bit as shown in Fig. 2, or of a pair of bits as shown in Figs. 1 and 3.

The bits (marked $e$) are of the same form whether used singly, or in pairs, and when used in pairs they are placed back to back, and support each other, while they can be freely slid past each other to increase or diminish the size of the hole to be bored by them. The bits have a cutting edge $i$, upon them, which extends the whole length of the bit, and this cutting edge is turned out at right angles to the shank or plate of the bit, and moves through the mortise in the auger shank, and thus the bit cuts from the very center of the auger to its outer end. There is also a lip $n$, formed at the outer ends of the expanding bits, which cuts the wood from the periphery of the hole that is being bored—the other cutting edges removing the wood from within this circular score made by the lip $n$.

$m$, is a wedge shaped key or pin, which passes through the shank of the boring tool, and bears against the expanding bits as shown in Fig. 3, to hold the bits firmly when they are properly adjusted.

Having thus fully described the nature of my invention what I claim therein as new and desire to secure by Letters Patent is—

In combination with a boring tool, an expanding bit or bits whose turned cutting edge and shank passes through a mortise in the shank of said boring tool, and is secured therein by a pin, as herein set forth, so that said expanding bit, or bits, may have a cutting edge from the center of the boring tool, to its extreme outer edge as set forth and described.

ALEX. HALL.

Witnesses:
 JOHN HOOPE,
 A. JAY HOOPE.